(12) United States Patent
Jensen et al.

(10) Patent No.: US 8,984,393 B2
(45) Date of Patent: *Mar. 17, 2015

(54) METHOD AND APPARATUS FOR CREATING AND FILING FORMS

(75) Inventors: Arthur D. Jensen, Grand Forks, ND (US); Steven H. N. Lunseth, Grand Forks, ND (US)

(73) Assignee: Aatrix Software, Inc., Grand Folks, ND (US)

( * ) Notice: Subject to any disclaimer, the term of this patent is extended or adjusted under 35 U.S.C. 154(b) by 1007 days.

This patent is subject to a terminal disclaimer.

(21) Appl. No.: 11/698,575

(22) Filed: Jan. 26, 2007

(65) Prior Publication Data

US 2007/0124665 A1    May 31, 2007

Related U.S. Application Data

(63) Continuation of application No. 10/108,055, filed on Mar. 26, 2002, now Pat. No. 7,171,615.

(51) Int. Cl.
| | |
|---|---|
| *G06F 17/00* | (2006.01) |
| *G06F 17/24* | (2006.01) |
| *G06F 17/22* | (2006.01) |
| *G06F 17/27* | (2006.01) |
| *G06F 17/21* | (2006.01) |

(52) U.S. Cl.
CPC ......... *G06F 17/243* (2013.01); *G06F 17/2247* (2013.01); *G06F 17/2725* (2013.01); *G06F 17/24* (2013.01); *G06F 17/211* (2013.01); *G06F 17/245* (2013.01)
USPC ...................................................... 715/221

(58) Field of Classification Search
CPC .............. G06F 17/243; G06F 17/2247; G06F 17/2725; G06F 17/24; G06F 17/211; G06F 17/245; G03G 15/5016; G06Q 10/10; G04L 29/06; G06K 9/00449
USPC .......................... 715/222, 223–247, 273–274
See application file for complete search history.

(56) References Cited

U.S. PATENT DOCUMENTS

| | | |
|---|---|---|
| 5,140,650 A | 8/1992 | Casey et al. |
| 5,495,565 A | 2/1996 | Millard et al. |
| 5,721,940 A | 2/1998 | Luther et al. |
| 5,742,836 A | 4/1998 | Turpin et al. |

(Continued)

OTHER PUBLICATIONS

Office Action from related U.S. Appl. No. 11/699,955 dated Jun. 24, 2013.

(Continued)

*Primary Examiner* — Quoc A Tran
(74) *Attorney, Agent, or Firm* — Nelson R. Capes; Gerald E. Helget; Briggs and Morgan, P.A.

(57) ABSTRACT

A method for designing, creating, and importing, on a digital computer having a memory and a processor executing a stored program, data into a viewable form viewable by the user of a data processing system, the viewable form duplicating the paper form, comprising the steps of: executing the stored program to convert the paper form into a viewable image that duplicates the paper form, the viewable image having a data field for receiving data; importing data into the data field; performing calculations on the imported data in the data field; allowing the user to review and change the data; and printing and/or electronic filing the viewable form.

17 Claims, 5 Drawing Sheets

(56) References Cited

U.S. PATENT DOCUMENTS

| | | | |
|---|---|---|---|
| 5,745,712 A | 4/1998 | Turpin et al. | |
| 5,832,100 A * | 11/1998 | Lawton et al. | 382/100 |
| 5,872,640 A | 2/1999 | Cohen et al. | |
| 5,963,966 A * | 10/1999 | Mitchell et al. | 715/236 |
| 6,026,187 A | 2/2000 | Siegel | |
| 6,043,819 A * | 3/2000 | LeBrun et al. | 345/418 |
| 6,182,142 B1 * | 1/2001 | Win et al. | 709/229 |
| 6,192,380 B1 * | 2/2001 | Light et al. | 715/207 |
| 6,199,079 B1 * | 3/2001 | Gupta et al. | 715/207 |
| 6,400,845 B1 * | 6/2002 | Volino | 382/176 |
| 6,446,048 B1 | 9/2002 | Wells et al. | |
| 6,711,554 B1 | 3/2004 | Salzmann et al. | |
| 6,886,136 B1 | 4/2005 | Zlotnick et al. | |
| 6,910,179 B1 * | 6/2005 | Pennell et al. | 715/207 |
| 6,961,902 B2 | 11/2005 | Anecki et al. | |
| 7,171,615 B2 | 1/2007 | Jensen et al. | |
| 7,203,699 B2 | 4/2007 | Bellamy | |
| 7,287,008 B1 * | 10/2007 | Mahoney et al. | 705/38 |
| 7,376,891 B2 | 5/2008 | Hitchock et al. | |
| 7,487,438 B1 | 2/2009 | Withers | |
| 7,561,734 B1 | 7/2009 | Wnek | |
| 7,607,078 B2 | 10/2009 | Geva et al. | |
| 7,669,116 B2 | 2/2010 | Lopata et al. | |
| 2001/0054046 A1 * | 12/2001 | Mikhailov et al. | 707/500 |
| 2002/0111888 A1 | 8/2002 | Stanley et al. | |
| 2002/0120628 A1 | 8/2002 | Hitchcock et al. | |
| 2002/0154334 A1 | 10/2002 | Laverty et al. | |
| 2003/0110443 A1 * | 6/2003 | Yankovich et al. | 715/501.1 |
| 2003/0120516 A1 | 6/2003 | Perednia | |
| 2003/0233296 A1 | 12/2003 | Wagner | |
| 2006/0190810 A1 | 8/2006 | Piersol | |
| 2007/0009158 A1 | 1/2007 | Geva et al. | |
| 2008/0098291 A1 * | 4/2008 | Bradley et al. | 715/223 |
| 2009/0019351 A1 | 1/2009 | Hitchcock et al. | |

OTHER PUBLICATIONS

Office Action from related U.S. Appl. No. 11/699,955 dated Oct. 29, 2013.

* cited by examiner

METHOD AND APPARATUS FOR CREATING AND FILING FORMS

CROSS-REFERENCE TO RELATED APPLICATION

The present application is a continuation of and claims priority of U.S. patent application Ser. No. 10/108,055, filed Mar. 26, 2002, the content of which is hereby incorporated by reference in its entirety.

BACKGROUND OF THE INVENTION

The present patent application relates to a tool which has been developed to facilitate the rapid production of "on screen" computer forms, which allow users to print out the forms for physical filing or electronically file the information. In this application the tool shall be called "Aatrix Forms Designer" or "AFD."

Aatrix Forms Technology Prior to AFD

Earlier software has had "on screen" fill in forms since 1990, at the time limited to the United States Federal Forms W-2, 1099 and 941. Early versions of these forms were implemented by displaying a graphic image of the form, and then overlaying text entry boxes that the user could fill in.

This early method required a fairly time consuming process by which the programmer would have to write the underlying code for all of the textboxes, including the determination of where they physically laid on the graphic.

Another version of the software, produced in April, 1993, was predominantly a programming tool that generated "C" or "Pascal" source code for use within the company's Payroll Series of products. The product consisted of a graphical interface for tracing "text entry" boxes over an existing graphic, then exporting the source code required to produce those text boxes. The source file was merged into the payroll projects and recompiled to produce object code for handling on-screen fill-in forms.

Further enhancements were added to the early product to allow it to generate HTML code for support of clickable graphics on the web, the ability to save and open existing AFD documents, and the addition of "Properties" for each text field that would allow the source code to perform rudimentary checking and formatting of the text data (defining something as a "money" field versus "text", for example, would only allow numbers to be typed in, and the field would be right aligned.)

The final major enhancement to be added was the ability for the forms designer to add graphical elements such as boxes, lines and text to the form. This allowed the form to function "on its own," without any underlying graphical field. Because the graphical data was stored in a "pure format," the resulting forms files were considerably smaller and more accurate, being able to take advantage of the computer's graphics processing capabilities for display and printing.

Other typical solutions involve the use of either graphics or Adobe's Portable Document Format (PDF,) both of which generate significantly larger files. A typical form which may be 100 kilobytes when stored as a GIF (Graphics Interchange Format) or up to a megabyte as a PDF can be stored in as little as 25 kilobytes with the above described format.

The critical piece of early AFD development was the creation of an interpreter, which was a small piece of source code that could be implemented in a program and which would automatically read, present on screen, and process an AFD file. This changed the focus of the tool from one which still required a bit of programmer effort (merging the source code into the project and recompiling) to one in which forms could be developed completely independent of programmers. At the time, the company included a "federal forms set" which consisted of the US Form 941, 943 and several others.

Subsequent to this, the company began its "State Forms" project, by which wage withholding and unemployment forms for all fifty states would be created with the AFD tool by non-programmers and could be implemented without any additional effort by coders. Minor enhancements to both the forms tool itself and the runtime module were required as issues were uncovered during the implementation of the state forms project, but these proved minor and by the end of 1995, Aatrix had available for sale forms for all fifty states.

A version of the AFD Runtime Module was created which was a stand-alone application—it did not need to be included with any other program. The means by which other accounting applications could support the forms was through a published standard called "Universal RectFinder Format" in a document released to the public in October 1995.

In September of 1996, Aatrix Development began a project to bring the state forms processing to the Microsoft Windows platform and for use via the Internet. The first step was agreeing to a file format, as binary data (which the forms were stored in on the MacOS) wouldn't be cross platform. Once that was established, another application was created on the Mac, which would read AFD form files and convert them to plain text for transfer to the Windows computer. This lead to the creation of the current software and accompanying system, which is usable on all platforms.

SUMMARY OF THE INVENTION

A data processing system for designing, creating, and importing data into, a viewable form viewable by the user of the data processing system, comprising:

(a) a form file that models the physical representation of an original paper form and establishes the calculations and rule conditions required to fill in the viewable form;

(b) a data file containing data for populating the viewable form; and (c) a form viewer program operating on the form file and the data file to perform calculations, allow the user of the data processing system to review and change the data, and create viewable forms and reports.

A principal object and advantage of the present invention is that it creates a viewable electronic form that exactly mirrors the physical representation of an original paper form.

Another principal object and advantage of the present invention is that it allows data to be imported into the viewable electronic form from outside applications.

Another principal object and advantage of the present invention is that it performs calculations on the imported data and allows the user to review and change the data and create viewable forms and reports.

Another object and advantage of the present invention is that it allows the creation of an electronically fileable form from the viewable form, based on a template.

Another object and advantage of the present invention is that it allows the electronically fileable form to be electronically filed in a variety of formats.

Other objects and advantages of the present invention will appear more fully in the Detailed Description of the Preferred Embodiment.

DETAILED DESCRIPTION OF THE PREFERRED EMBODIMENT

Figure 1:
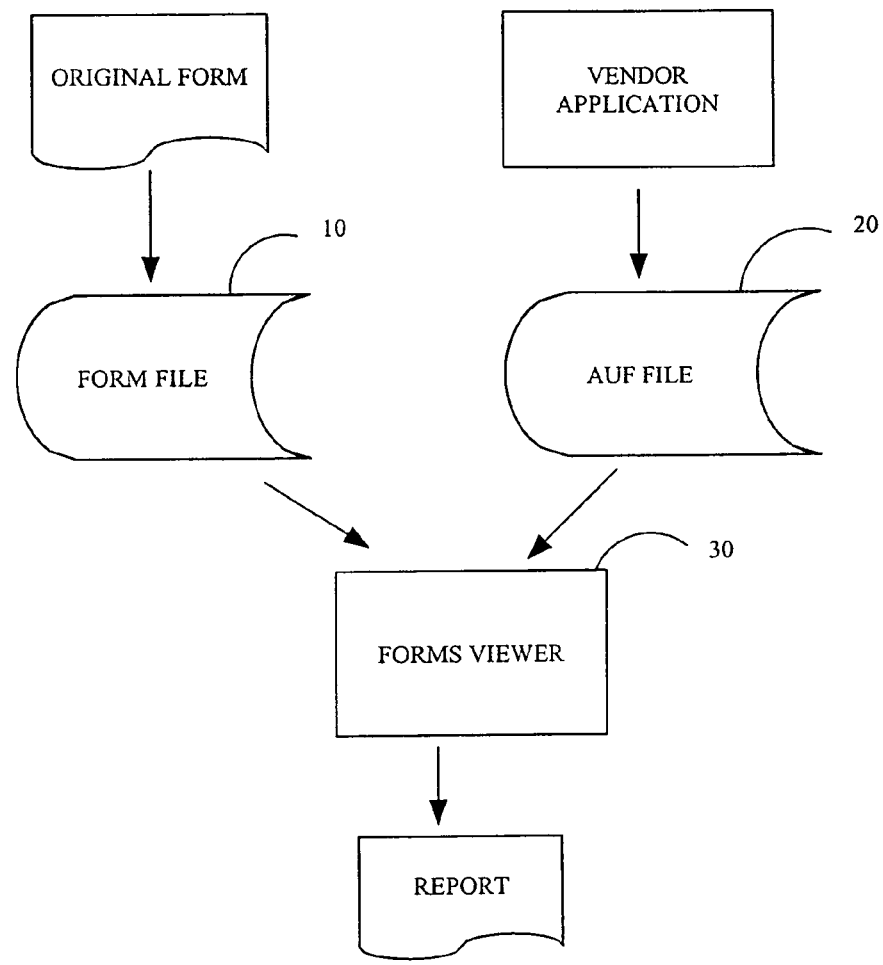
FIG. 1. is a block diagram of the present invention.

FIG. 1 is a general block diagram of the invention. The program is designed around three main components. The first is a proprietary form file 10 created using in-house form development tools. The form file directs the program in producing a replica of the original form. This form file is designed to model not only the physical representation of the form but also the calculations and rule conditions required to fill in the form. This allows users to interact with any form and have it automatically provide real-time updating of computed values.

The second main component is the data file 20. Through this file, data from the vendor application is seamlessly imported into the program and used to populate the form fields. This file is known as the Aatrix Universal File (AUF). It contains only the data for a selected reporting period based on the guidelines programmed into the forms. So the AUF generated for a form the user is filing for the first quarter of the year must only hold data pertaining to the first quarter of the year.

The third main component is the viewer 30. The viewer will generate a report 1400 by merging the data in the AUF file 20 with specific fields in the form file 10. It performs the calculations and allows the user to review and change the field values. The forms/reports may be saved, printed, and e-Filed. In addition, the program has the ability to securely (using encryption algorithms) transmit forms/reports with data, as well as other critical company information, across the Internet to an e-File Server.

Creation of the Proprietary Form File:

Forms design is the process by which the seller creates a computer-generated form so that when printed, it will exactly match the original paper form. Form design includes static text and drawn elements. Static text may include such things as the form title and instructions for filing out and/or mailing the forms. Drawn elements include lines, boxes, circles, triangles or any other non-text items that appear on the original form. Note that the only exception to this is if the form contains copyrighted graphic images, such as the state seal, which the seller is not allowed to reproduce.

Figure 2A:
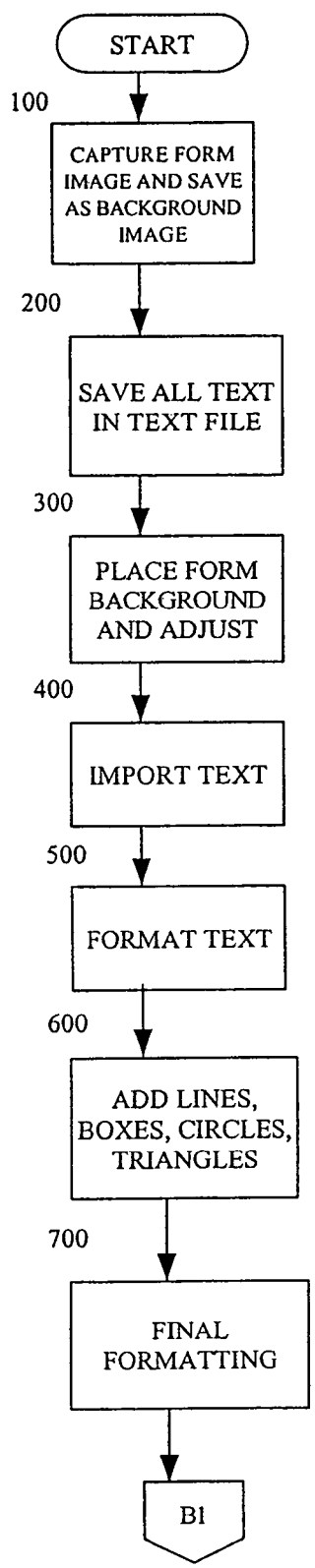
FIGS. 2A-2D are flowcharts of the present invention.

The first step 100 (FIG. 2A) in forms design is scanning, or otherwise digitally capturing an image of the original form and saving it as a background image, usually in PICT format. This is typically done on a flatbed scanner using a graphics software package, though it can be done by other mean including, but not limited to, using a digital camera to capture the image. Once the image has been saved, it can be used as a "background" in the program.

The second step 200 in Forms Design is saving all text appearing on the form into a text file. The text file is later used to import the text into the program and then can be further manipulated. In the preferred embodiment, this can be accomplished in one of two ways. The form, while still on the scanner, can be scanned a second time with OCR software that can save all text automatically. The second method consists of the designer typing the text into a text document manually.

Next, the program will allow the background to be placed 300. Once placed, the background can be adjusted and test printed to allow the designer to compare the alignment of the original form to the background test print. This is done so that when the form is ultimately completed, the seller knows that the printed form will be an exact copy of the original form.

When the background is placed correctly, the text file containing all text, which appears on the form, can be imported 400. The reason for importing the text into the program stems from the ease in which it is completed, compared to the time consuming method of typing each line in separately.

The next step 500 is to move the text to the correct position on the form for formatting. Formatting the text includes changing the font and size of the text as well as setting whether the text should appear in bold, Italics, underlined, left-, right-, or center-justified, or rotated 90, 180, or 270 degrees. Just about any text formatting, which appears on the original form, can be recreated using the program.

Forms could be created without the use of a background. The forms designer can opt to not use a background image, and can design a form from scratch, by simply placing any desired text and drawn elements, such as lines, boxes, circles or triangles where ever the designer see fit. By simply adding a few lines of text, and some lines or boxes, one can create a form, which can be either printed out or filled out on the computer, easily and quickly.

Once all text has been placed, the designer can then add 600 any lines, boxes, circles or triangle that need to appear on the form. Line and boxes can also be formatted. Lines can be sized anywhere form 1 to 5 pixels in width, and can be set as solid, dashed, or dotted lines. Boxes can also be formatted. Aside from changing the height and width of the box, the lines of the box can also be sized from 1 to 5 pixels in width, or set to not appear at all. The box can be filled with varying degrees of shading such as light, medium, or dark gray and black. The box can be changed into a "circle rectangle" with the left and right sides of the rectangle appearing as half circles, or the 4 corners of the box can be rounded. And finally, the box can also be changed into a circle or a triangle pointing up, down, left or right.

All text and drawn elements can be moved, sized and formatted as necessary 700 to make the form look like an original paper form, if this is necessary. In addition to this, the program also has the capability of hiding text or drawn elements so that either appear only on the display screen, only on the printout, or not at all. This allows the designer to either print instructions for the user on the screen which do not need to appear on the printout, to print information on the printout which is not required to appear on the screen, or to simply hide the text or drawn elements all together, such as in revision information which is only important to the designers. Once the complete form is printed out, it is sometimes difficult to differentiate the copy from the original, which is the goal of the program.

The program has many features and capabilities that allow further editing, design, modification and use of the forms created. Linking multiple pages, recalculating the form based on data entered, adding and modifying data fields are some features.

Figure 2B:
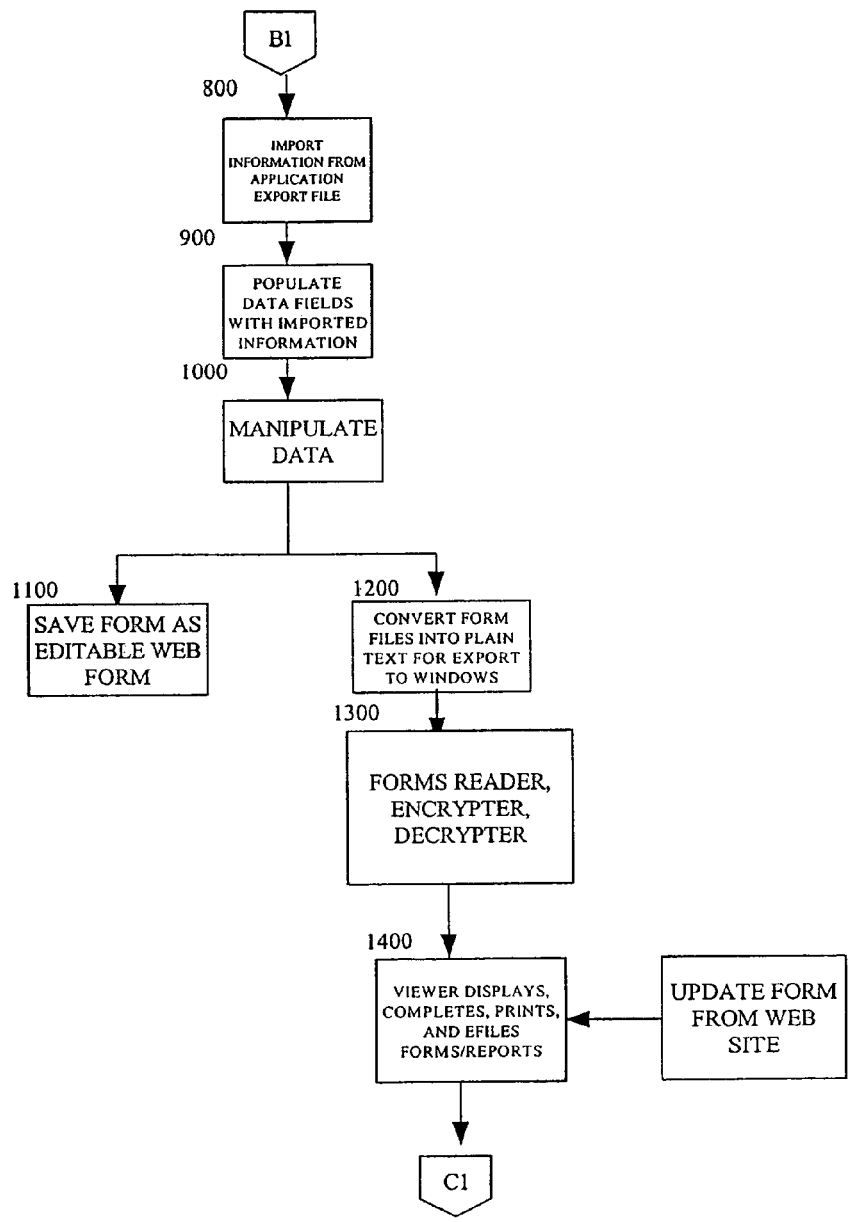

Creation of the AUF File Forms programming (FIG. 2B) is the section of the program that works with data fields. Fields are areas on a form that need to be filled in with alphanumeric information, either automatically taken from another program, such as the payroll application, or manually filled in by the user. The program is capable of pulling this information from an export file from many accounting and payroll applications. For common fields, such as Company Name, there remains the capability to automatically fill in that information on the form without the user having to enter it.

In its preferred embodiment, the main program 800 pulls information from the user's payroll or accounting application's export file, thus filling in 900 certain information on the form without the user having to type it in. With the export file, a lot of information that would normally have to be manually filled in is tagged for populating fields. This includes the Company Name, Address, Federal and State ID Numbers, Phone Numbers, Contact Name, Contact Address, and Contact Phone Number. Also, the program can fill in most of an employee's information including the Employee's Name, Address, Phone Number, Wages, Pay Rates, and Individual Paycheck Amounts including Deductions, Employer Paid Items, and Types of Income. All the paycheck information can be split out to individual days, or added together to get many different totals for Weekly, Biweekly, Monthly, Semi Monthly, Quarterly, Semi-Annually, or Annually to mention a few.

There are various types of fields that can hold data. These types of data fields allow us to manipulate data 1000 in many different ways. Below is just a partial list of our current data field types that are added to regularly.
- a. Entered—Allows manually entered information in this field.
- b. Static Text—A data field that is always the same every time the form is used.
- c. Checkbox—Creates a checkbox field.
- d. Addition—Creates a field that holds the result of adding multiple selected fields.
- e. Subtraction—Creates a field that holds the result of subtracting two selected fields.
- f. Multiplication—Creates a field that holds the result of multiplying two selected fields or one field by a static value.
- g. Division—Creates a field that holds the result of dividing two selected fields or one field by a static value.
- h. Table—Creates a field that holds a simple defined table that can perform multiple level calculations. For example, from 0-100 multiply by 0.1, from 101-200 multiply by 0.2, etc.
- i. Use Table—Creates a field that holds the result of performing a calculation on one field using a Table field.
- j. Look up in form—creates a field that looks for a specific field's value on a different form.
- k. Combined—creates a field that concatenates multiple selected fields together to create one field.
- l. Fill-in Links—creates a field that fills in specific information automatically from a predefined link to a data file.
- m. Matrix—creates a matrix, or repeating set of fields. See the section on matrices below.
- n. Checksum—creates a field that calculates a one-character result using predefined algorithms.
- o. Number as text—creates a field that converts a number to text, such as used on a check.

Many different kinds of data that can be used in the form. These kinds include dates, currency, alphanumeric, integers, percentages, and multiple place decimals. With all of the kinds of data available, the seller can limit the number of characters stored in all data types. Also present in the program is the ability to format this data in multiple ways.

For example:
1. Dates—Seller can format a date field to be Jan. 8, 2002, or 01/08/02, 2002/01/08, or January 8, 2002 among other ways.
2. Currency—round the currency to whatever decimal the form needs.
3. Alphanumeric—limit the number of characters display, printed or stored in an alphanumeric field.
4. Integers—allow only positive or include negative integers.
5. Percentages—specify how many decimals to allow after the decimal point.
6. MP Decimals (multiple place decimals)—specify the number of places behind the decimal to allow in this field.

The program is also able to recalculate on the fly the numbers on the form based on the data that is entered in the form. In the interest of clarity, Applicant explains that "on the fly" means that calculations and rule functions are performed immediately and dynamically in response to user input or data calculations. This has the benefit of allowing the user to immediately see the results of his or her data entry, and assisting in the production of accurate and complete forms. For example, if there is known a Company's Total Wages paid for a quarter and then a field with Taxable Wages for a quarter, the program can calculate the Excess Wages from those two numbers. First, the programmer would set the Total Wages and Taxable Wages fields to recalculate the form when anything in this field changes. Then the programmer would set the Excess Wages field as a Subtraction field that subtracts from Total Wages the Excess Wages. This will cause the result to be placed in the Excess Wages field and be recalculated if either Total Wages or Taxable wages change.

Along with this capability, the program also can carry totals from page to page and add across multiple pages. This is achieved by setting the global attribute to a field, and adding this field with the global attribute to any other pages that needs to display this information. This feature is very vital to forms that need the same data on different pages of the form. This can be anything from dollar amounts, alphanumeric characters, etc. In addition, this allows the user to change the information on one page and all other pages with the same named field with the global attribute will be automatically updated. This eliminates one common error.

The programmer can also place simple "If . . . Then" rules on the form to manipulate data on the form, or the programmer may put multiple rules on fields. Conditions may also be programmed into the forms. Examples of conditions are more than/less than, equal to/not equal, visible/not visible, and for checkbox fields, a checked/not-checked condition.

Based on those conditions, here are a few ways that the programmer can manipulate data within a form:
- a. copy from one field or another on the page.
- b. show or hide a field.
- c. enter specific text
- d. lookup a value in a predefined table.
- e. do nothing.

Another great program capability in designing forms is listing the individual information for a group with a minimum of design work. For example, if the programmer wants a list of each employee's name, address, and SSN number, the programmer would easily be able to pull in this information using a matrix by using as few as six data fields.

First, a matrix, as used here, is any set of fields that display each employee's information in a set of fields that repeat as many times as there are employees organized in rows or columns.
1. A matrix is setup by first adding the fields to a form. Using the above example, six blank fields would be added.
2. When it comes time to name them, the user makes sure that each matrix field name ends with an asterisk, making them distinctive from non-matrix fields. To continue using the above example, the names of our six fields would be, EName*, EAddress*, ECity*, EState*, EZip*, and SSN*.
3. After they are named, the user would determine the type of data in each field and any special formatting required to do to each field.
4. The program does have the capability to calculate and recalculate totals for each employee within a Matrix. This is especially nice when correcting totals or reported amounts. The user can use simple "If . . . Then" rules to manipulate the data within the matrix for each piece of information.
5. After the fields are named, the next thing task is to determine how many times to repeat this information on this page and how far apart to space the repeating information. The user has several ways to determine the distance between columns or rows, but when the Matrix is initially programmed, it must be entered as a number of pixels based on 72 pixels per inch.
6. After determining the number of times this information is repeated on a page, the programmer must determine whether to repeat this page as many times as it takes to list all the information on this template page, or to do a continuation page. For example, if there are 50 employees and the matrix repeats 10 times on a page, does the user want to repeat this page 5 times to list all the employees on this template, or does the end user have another form page that continues the list of employees?

The user can also spawn or pull up other forms based on conditions of certain data fields on the current page. For example, if the form the user is filling out requires the company to make a payment, the user can set a simple condition stating that if the Payment Due data field is more than 0, then open a Payment Coupon and fill in the amount to be submitted.

The program also has the capability to recreate the common barcode types used on forms issued by government agencies. The user can pull information from the data on the form, and manipulate that information in many different ways stated above, and recreate the barcode to the government agency's satisfaction.

Another feature is the ability to calculate multiple check digits. A check digit is a result of a calculation on specific data.

For example, a Modulus 10 check digit is a way to calculate a single digit result on a number, by multiplying each digit by 2 or 1, adding up the resulting number and dividing by ten, then subtracting that result from the next multiple of 10. Normally, the program would have to split out each digit separately, multiply them by 1 or 2, then add all digits, then dividing by 10, then subtracting the remainder from the next multiple of ten. This gets very tedious the longer the number gets. However, the program can do this very simply, by making this check digit field a special field named Checksum and then programming it what field to use in the algorithm and what algorithm to use, from the list of preprogrammed algorithms.

Another feature the program is capable of producing is scanlines, which are required by some various forms. A scanline is line of data in a specific font that combines some vital information on the form or manipulated from data on the form that is scanned in to speed the processing of that business's form.

For example, a simple scanline is 010102123102123456789323457. The following is an explanation of the information in it and how it is created.

1. First, 99% of all known scanlines have a specific font it is created in, OCR-A.
2. Secondly, this scanline contains 5 pieces of data.
   a. 010102, is the beginning date, 01/01/02, for the data included in this form.
   b. 123102, is the ending date, 12/31/02, for the data included in this form.
   c. 123456789, is the Federal EIN, 12-3456789, for this sample.
   d. 3, is the Checksum that was calculated based on the Federal EIN using a generic Modulus 10 checksum.
   e. 234567, is the State ID number, 234567, for this sample.
3. Thirdly, the program uses the fields to format the data displayed on the form to a form that can be used in a scanline.
4. Lastly, the program uses the combined field type to combine the multiple intermediary fields into a final scanline.

When the time comes to update the form, a great feature is the ease of which the form's data fields can be updated on the form by going through the above process with an existing form file.

The program has the capability of creating a version of the form for electronic filing by copying or manipulating from data displayed on the screen. For example, if the electronic file requires that a list of employees' first names to be limited to 15 characters, however, the paper form has no such limitation, the program has the capability to accommodate this. What the programmer would do is to copy the employee first name field, that is visible and editable, to another hidden field that only allows 15 characters and then use that field for the electronic file. In another example, if the electronic file needs the filing date in the format YYYYMMDD and the form displays it as MM/DD/YYYY, the program can accommodate this as well. All that is needed is a hidden date field with the necessary format specified and a rule to copy from the visible filing date field to this hidden field.

The program allows for the capability of saving 1100 any form as an editable web form for Mac or Windows, that calculates and can have data imported into it. The way the program does this is to export the form as a web page, which would export a Mac web page, a Windows web page and a Printable web page. This form would then be loaded onto the seller's web server and available on a web site. The customer can either manually fill in all values, or upload a data file that will fill in the web form for them making whatever calculations and manipulations necessary.

Upon completion of the form design in the program, RFExporter 1200 is used. RFExporter is a small MacOS utility that converts the created form files into plain text files for export to other platforms, such as Windows. The forms are stored on the MacOS computer server in a proprietary binary format, including additional configuration data, which is not needed for Windows. The exporter converts each of the form elements (e.g. lines, text fields, calculations, etc.) from the base format to the tab delimited text form, stripping out any information, which is not needed for cross platform use. The program operates in single form or batch mode to convert multiple files at once.

The program also contains a Forms Reader/Encrypter/Decrypter- or FRED subprogram. The FRED subprogram is a multi-purpose in-house tool used by the form designers during the creation of a form. In its preferred embodiment, it consists of a tab-based dialog with multiple tabs across the top.

The first tab allows encryption, decryption, and index generation. FRED's primary purpose is the creation of encrypted form files which have a specific file suffix, such as ".AFM", from corresponding form source files which have a text (".TXT") file suffix as well as reversing the process by decrypting ".AFM" files into their corresponding ".TXT" files. The first tab is laid out as follows: There are two directory selection controls located at the top of the property page, the first of which is the directory where the forms are located, and the second of which is the directory where the ".TXT" index file is to be located. A windows-explorer style directory and file selection control adorns the center of the first property page. Finally the form selection list is located at the bottom of this property page. Multiple files may be selected from the file selection list and added to this list. This allows forms to be added from more than one directory at a time. To the right of the form selection control are a series of buttons that allow for manipulation of the list, generation or appendage of the ".TXT" file, and encryption of forms on the form selection control.

The second tab contains a list control that facilitates the viewing of the aforementioned ".TXT" file in a convenient sort-able table view. Columns may be sorted by clicking on their headers.

The third tab is used for obsolescing old forms on the seller's updater FTP site. Forms are selected and added to the obsolete form list on the FTP site.

The fourth tab is used for updating the form records in the seller's local database to match the forms.txt and source form files. The user simply selects the folder that contains the form *.txt files, and all forms in that folder are added to or updated on the forms database.

The third main component is the viewer 30. The viewer will generate a report 1400 by merging the data in the AUF file 20 with specific fields in the form file 10. It performs the calculations and allows the user to review and change the field values. The forms/reports may be saved, printed, and e-Filed. In addition, the program has the ability to securely (using encryption algorithms) transmit forms/reports with data, as well as other critical company information, across the Internet to an e-File Server.

This table lists the meanings of the various symbols used throughout this document.

Data File Description.

| Symbol | Meaning |
| --- | --- |
| → | Tab (ASCII code 9 or similar command) |
| ¶ | Carriage return (ASCII code 13 + 10 or similar command) |
| ↪ | Line continuation |

The forms index file provides the vendor application with information on the forms available to the program. This ASCII text file is named Forms.txt and can be found in the program application directory. It contains records with tab-delimited fields terminated by a carriage return. Each record describes a single form. For example:

[Form Name] → [Display Name] →
[State] → [Form Type] → [Modify Date] → ↪[Skip PAY] →
[Report Period] → [Data Breakout] → [Decscription]¶

Here are descriptions for each of the fields in the above example.

TABLE 1

Fields in forms index file.

| | Field Name | Description |
| --- | --- | --- |
| 1 | Form Name | Name of the form to place in the configuration file (maximum of 32 characters) |
| 2 | Display Name | Name of the form to display in the list (maximum of 32 characters) |
| 3 | State | State abbreviation or FE for federal (2 characters) |
| 4 | Form Type | Type of form (Federal, State, Local, FUTA, SUTA, New Hire, Sales Tax, Direct Deposit, W2) |
| 5 | Modify Date | Date the form was last modified (formatted as MMDDYY) |
| 6 | Skip PAY | Flag indicating whether PAY records in the AUF can be skipped (0 = need PAY records, 1 = skip PAY records) |
| 7 | Report Period | Report period of the form (1 = any, 2 = annual, 3 = quarterly, 4 = monthly, 5 = daily) |
| 8 | Data Breakout | Data breakout requirement of the form (1 = annual, 2 = quarterly, 3 = monthly, 4 = daily) |
| 9 | Description | Description of the form (maximum of 254 characters) |

The Report Period field indicates what choices should be available to the user for the report period. If the value is 1, then there should be a choice of Annual, Quarterly, Monthly, Daily, or Between. For the other values, there should be a single choice of Annual for 2, Quarterly for 3, Monthly for 4, and Daily for 5. If the choice is Annual, then the year is selectable. If the choice is Quarterly, then the quarter and year are selectable. If the choice is Monthly, then the month and year are selectable. If the choice is Daily, then a specific date is selectable. If the choice is Between, then the first date and last date for a date range are selectable.

Here is an example for a federal form.

940_Form → 940 Form → FE → Federal →
032700 → 1 → 2 → 4 → ↪
Use this form to report federal unemployment wages and taxes.¶

This indicates that the 940 Form is a federal form last modified on Mar. 27, 2000. The PAY records can be skipped in the AUF, so only the TOT records are needed. The form has an annual report period and requires daily total breakouts.

Here is a specific example for a state form.

CA_DE-6_Form → DE – 6 Form → CA → State →
101100 → 3 → 2 → ↪
Use this form to report employees and their quarterly wages.¶

This indicates that the DE-6 Form is a CA state form last modified on Oct. 11, 2000. The PAY records are needed in the AUF. The form has a quarterly report period and requires quarterly total breakouts.

The Aatrix Universal File (AUF) 20 contains the report data exported from the vendor application. Through this ASCII text file, data from the vendor application is seamlessly imported 800 into the program and used to populate the form fields. It contains only the data for a selected reporting period based on the guidelines programmed into the forms. So the AUF generated for a form the user is filing for the first quarter of the year must only hold data pertaining to the first quarter of the year.

The AUF contains records with tab-delimited fields terminated by a carriage return. The first field holds a tag that defines the record and indicates what fields will follow.

[TAG] → [Field 1] → [Field 2] → ... → [Field *n*]¶

The number and ordering of fields is critical. If fields are empty, all tabs must still be present within the record. For instance, if there is a record with four fields and the first and fourth are left blank, then it will be written as:

[TAG] → → [Field 2] → [Field 3] → ¶

Comments may be designated in the AUF by two colons (;;) or similar keystrokes. Everything after the two colons will be ignored until the next carriage return or the end of the file.

;;[Comment]¶[TAG] → [Field 1] → [Field 2] → ... → [Field *n*];;[Comment]¶

Each of the fields has a field type with optional criteria.

TABLE 2

Field types.

| Field Type | Description |
|---|---|
| CHAR [format][n] | Character string |
| | [format] is the string format code (see Table 4) |
| | [n] is the number of characters |
| DATE [format] | Date |
| | [format] is the date format |
| DECIMAL [n][range] | Decimal number |
| | [n] is the number of places after the decimal point |
| | [range] is the range constraint |
| INT [range] | Integer number |
| | [range] is the range constraint |

Fields with the field type CHAR can have a string format code that designates the possible formats accepted in the field.

TABLE 3

String format codes.

| Format Code | Description | Examples |
|---|---|---|
| FEIN | Federal employer identification number | 12-3456789 |
| | | 12 3456789 |
| | | 123456789 |
| PHONE | Phone number | (123) 456-7890 |
| | | (123) 456 7890 |
| | | 123-456-7890 |
| | | 123 456 7890 |
| | | 1234567890 |
| SSN | Social security number | 123-45-6789 |
| | | 123 45 6789 |
| | | 123456789 |
| ZIP | Zip code | 12345 |
| | | 12345-6789 |
| | | 12345 6789 |
| | | 123456789 |

Year values can range from 0 (or 00) to 9999. Years from 0 (or 00) to 15 are assumed to be 2000 to 2015. Years from 16 to 99 are assumed to be 1916 to 1999. Years from 100 to 9999 are assumed to be the full year. Decimal and integer values may either include commas or not.

In general, record fields should remain empty if the data is unavailable or not applicable. For example, a field for a dollar amount should be left blank rather than set to 0.00 if the value is unknown or does not apply. Otherwise the form may have fields filled in when they should not be. the program will alert the user by highlighting the field in red if there are fields on the form that are empty but require a value.

The vendor application may not store the values for some fields in a format that is compatible with the AUF requirements. For instance, names or addresses may be stored as single values. When these are placed in the AUF, they must be split apart in most cases.

The forms also impart various data requirements for the AUF. These requirements are found with other form information in the forms index file. By examining the data requirements for a form, the vendor application can determine what data it should supply in the AUF to correctly fill in as much of the form as possible.

Report Generation

The viewer will generate a report by merging the data in the AUF 20 with specific fields in the form 10. It performs the calculations and allows the user to review and change the field values. The forms/reports may be saved, printed, and eFiled. In addition, the Program has the ability to securely (using encryption algorithms) transmit forms/reports with data, as well as other critical company information, across the Internet to Aatrix's eFile Server.

Registration codes are needed to fully enable the forms used in the program. The user will receive all forms, which will work in demo mode only, printing the word DEMO across the form so that it cannot be printed in certified format for filing. This allows users to "try before you buy" for any form and makes distribution easy, since all the forms are included all the time. When the user wishes to purchase a form, they call a sales center, providing their EIN and the state(s) they need. The selling company will provide a multi-user registration code generator that allows the salesperson to give the user a registration code enabling a specific state form set for up to one year. There is also an option for the user to receive a code for all states, providing they have purchased the all-states package. The program will warn the user one quarter in advance of registration code expirations and prompt the user to call in for a new registration code.

Each form is associated with a form category. Some potential form categories are:
Federal/State Payroll
Sales Tax
Income Tax
HR
Cafeteria/Flex
Pension When a registration code is generated, it will be built for a specific EIN or similar identifier, one or more form categories, a specific state or all states, and an expiration date.

The viewer presents an onscreen representation of the form to the user. Lines, boxes, and text are used to draw the background of the form. Fields are overlaid on top of this background. Some fields are editable by the user, whereas others are non-editable and based on calculations and rules. If you change one field, it may result in automatic changes in other fields throughout any pages of the report.

A report can contain many pages, which can have different form backgrounds and field layouts, though only one page is shown at a time. The user can quickly switch pages through next and previous page buttons, keyboard hotkeys, or a dropdown list of all pages in the report. New pages can be added easily for certain reports that allow for additional information. Reports with employee information can have pages added to include more employees. Other reports can add pages for optional forms based on field conditions. For instance, if the field for the amount due on a report is greater than zero, then a dialog may ask the user if they want to include the related check form to pay this amount.

A report can be saved as either a draft or history and then opened again at a later time. It starts as a draft, which can be modified and is yet to be completed. When a report is saved as a draft, the user can continue working on it later on when it is re-opened. Only one draft can exist for a given form. The user will see a list of available drafts if they choose to open a draft.

When the user selects an operation that will finalize the report, such as printing a final copy or e-Filing, it becomes a history and is saved as such. Histories cannot be modified and many can exist for a given form. If there was a corresponding draft file before the history was saved, it is backed up and removed from the list of drafts. The user will see a list of available histories if they choose to open a history.

Hard copies of reports can be printed 1400 from the program. There are a few factors that can affect the printout. The first factor is whether the form is demo only or registered. If it is a demo, then a "Demo" watermark will be placed across the printout. The second factor is whether the printout is a draft or final copy. If it is a draft copy, then a "Draft" watermark will be placed across the printout. The third factor is whether the printout is an employer copy, which is for the user's records only, or a certified copy, which is to be sent in to an agency. If it is an employer copy, then a "For Records Only" watermark will be placed across the printout.

A certified copy can be one of three certification types: full certification, alternate form, or certified as numbers only. A form is assigned only one of these certification types. Full certification indicates that the form is an exact duplicate of the agency form. Alternate form indicates that the printout is a special layout for data on blank paper. Certified as numbers only indicates that an existing, preprinted form is required and the data will be printed to fill it out.

Different printer drivers may not print in exactly the same position on a page. The page align feature allows the user to adjust the print margins to ensure that data prints correctly on a pre-existing form. To help in the alignment process, the user can print a special alignment form and a test page of the current form.

Windows TrueType fonts were created to resolve printer and screen display issues in the program. The requirement set by some filing agencies for font parameters, like horizontal line length and vertical spacing, is extremely specific. Alphanumeric and barcode fonts were specifically designed to fit the needs of the program and the way it renders fonts on screen and on the print so the duplicated form exactly matches the original.

Electronic Filing

In order to e-File, the user must initially complete an e-File enrollment process. The program will present a step-by-step wizard dialog requesting information on the user. After the wizard is finished, a form will be displayed containing this information and asking for optional information. The user then prints, signs, and submits the form to the selling company. Ideally, a user ID and password will be sent to them through e-mail. If not, other arrangements may be required to obtain the ID and password. These are entered into the program to activate e-Filing.

When the user is ready to e-File a report, they are given another wizard dialog, which first requires them to enter their password. Then the wizard asks for credit card or other payment form information. The user can choose whether to have this stored for the next time they e-File. Once this information is completed, the program connects to the seller's e-File Server over the Internet. Pricing information is sent back to the client where the user is asked to confirm the e-File operation. Upon confirmation, the e-File is transferred to the server with a progress bar dialog indicating the intermediate status.

Forms Updating

Updates 1450 will be available through a command in the program. This will update the forms and application files to their most recent versions that may be required by the final destination user. Ensuring current form use eliminates possible problems when old forms are filed with federal, state, or local agencies or other such entities. The user will also have all the latest features and bug fixes, if any. After the Updater finishes, an Internet browser window opens to a website customized for the software vendor. Maintained by the seller, this website with contain news and information on the forms and the program itself.

In order for clients to keep the programs and their forms data files up to date, the seller has provided the customers/users with the updater 1450. This program may be run from either Window's Start Menu or from the main program. Using the Updater allows the customers to always have up to date versions of the program and it lets them keep their forms up to date.

The program Updater is actually broken into two parts, the Updater (also known as the Meta-Updater) and the Forms Updater. The Updater will connect to the seller's FTP site and check for new versions of Forms software, including the Updater itself. It will download all new files that need to be updated and then run the Forms Updater.

The Forms Updater allows the user to select which forms to download forms from, and downloads any new or updated forms from that category. It is laid out in a standard Windows style wizard.

The program also contains a viewer that is an in-house tool for the seller that allows the user to graphically view all instances of a line type in a form (either a ".TXT" or ".AFM" file). It uses MDI (Multiple Document Interface) to display any number of forms at once. Each document is actually a grid where rows represent lines and columns represent fields. On the left is a dockable tree view, which allows the user to select a line type and which fields of that line are visible. On the bottom is a dockable tab view that has two tabs: one for field values and one for search results.

For instance, a forms developer may want to view only the field lines of an open form. The user would first select the field checkbox on the tree-view to the left. The user would also need to expand the tree and select which fields he/she would like to be displayed on the main grid window. Finally the user would click a button immediately below the tree control. The button could be denoted as "generate". This would update the current document to display all field lines of that form and the specified fields.

When an item is selected in the grid view, all fields of that line are displayed in the field values tab at the bottom of the screen in a report list control. Each row of this report represents a field. Information displayed for each field include field ID (one or two letters representing the field in the old style) the field name, its current value, and a detailed description of the field.

The in-house viewer has the ability to perform field searches across multiple forms. When the user selects this option from the menu, the user is presented with a dialog box which prompts for the field type to search (FLD,TXT,etc.), two edit controls which represent what to search for. If the user chooses to use both edit controls, he/she must select from a list the Boolean relationship (And/Or/But not) between the two edit controls. The dialog also prompts the user whether to search in the active form only, all forms in the workspace, or all forms in the active form's folder. In its preferred embodiment, it also provides two checkboxes that allow the user to choose whether to do a case-sensitive search, and whether to limit the result to one search hit per file. Once the search is complete, all search results are displayed in the "Search Results" tab at the bottom of the screen. Clicking on an item in this tab results in the form being loaded (if necessary) and brought to the front in the main view. The line where the search hit took place is highlighted.

The viewer is laid out such that it is reasonably easy to add new reports types. These options are usually accessed from the main menu.

Client/Server Communication

Figure 2C:
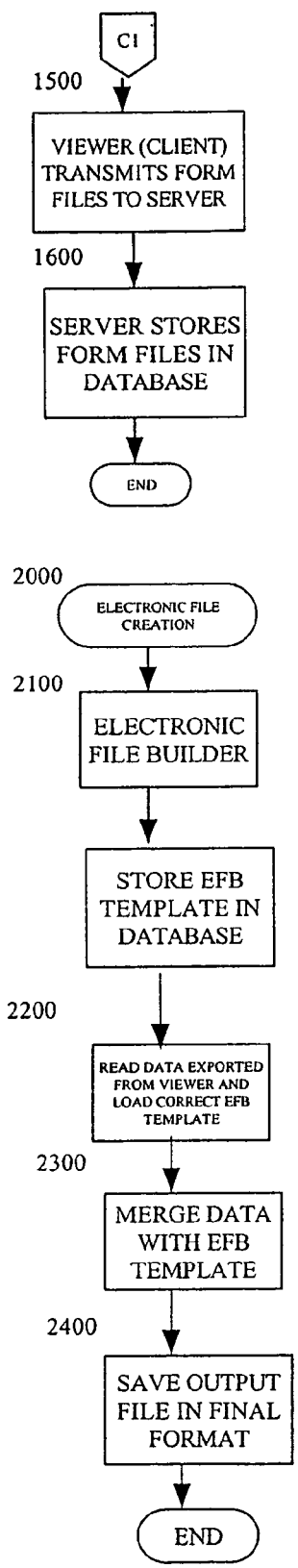
Figure 2D:
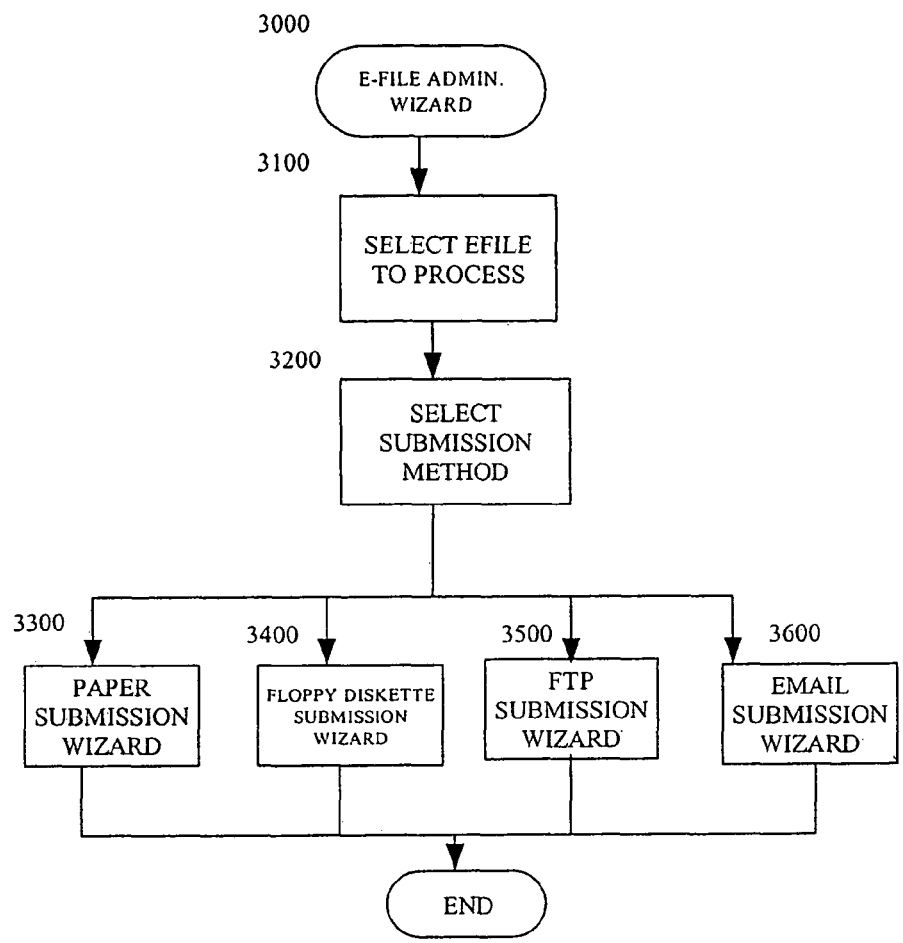

A client/server module is included as part of the invention to facilitate communication between two computers. The server 1500 (FIG. 2C) receives communications from the client and stores a connection list that shows the transfer status. The server also shows the Internet Protocol (IP) address at the client computer, as well as the bytes received.

The server is configurable from a connection tab, which allows an administrator to set file locations. This is where data connections are controlled. The timeout is how long the server will wait for communication before it will stop transmission and send a "timeout" error to the user.

The server overview is where server status can be observed. Ideally, red radio buttons indicate a portion of the server is that is inactive, while green radio buttons indicate the specific portion that is active. The server authenticates users using the communication with the database.

The Client\Server module is an invertable, secure, synchronous socket layer based on UNIX\BSD's implementation of berkley sockets running over TCP\IP. It is invertable in the sense that the socket code can act as either a server and\or a client. The distinction between a client or server socket is made primarily at the point of authentication and is determined by which socket initiates the call(Client).

Discrimination:

The security of the channel is accomplished through an authentication sequence:
1.) a random number(crl) is generated by the client and this number and the user ID are sent to the server.
2.) the server looks up the user Id and its associated password
3.) a random number (srl) is generated by the server and sent back to the client.
4.) the server hashes srl with the associated password to form the session key.
5.) the client receives srl and then hashes it with its password to form the session key.
6.) the client encrypts srl with the session key and sends it to the server.
7.) the server receives and then decrypts E(srl) with the session key.
8.) if the decryption of E(srl) is successful then the server encrypts crl and sends it to the client
9.) if the decryption of E(crl) is successful then authentication is complete.
10.) all subsequent communications are triple DES encrypted in CBC mode with the key Hash(srl+password).

All data sent over the channel is converted into proprietary packets, the packets work in conjunction with authentication and encryption to increase security.

Packet Diagram goes here ->:

| | |
|---|---|
| LONG | m__lTimeStamp; |
| DWORD | m__dwCRC; |
| WORD | m__wVersion; |
| BYTE | m__bCtrlNum; |
| BYTE | m__bTCPNum; |
| UINT | m__uLength; |
| BYTE | m__Buffer[FPACKET_MAX]; |

The CRC (cyclic redundancy check) is calculated and added to the packet before its encrypted and sent. The receiving socket decrypts the packet and calculates the CRC for the data in the packet. It then compares this value to the one contained in the packet header and if they match, suggests with a high probability that the data received is the same as that which was sent. A time stamp accompanies each packet to prevent "Replay" of packets and to produce a unique initialization vector for the cypher block chaining mode of encryption.

Additional socket layer properties include the following:
fully multithreaded to facilitate concurrency
allows for dynamic (ctrl codes embedded in packets) client\server communications
or, client\server communications can be scripted
sockets auto detect subsystem or network failures and disconnect gracefully
sockets respond to mal-formed packets rationally and disconnect gracefully
resistant to denial of service attacks involving port scanning and repetitive connection attempts
socket layer acts as a surrogate to protect the database from direct user access.
controls all connections to the ODBC compliant database and enforces table and record locking
to prevent data corruption or database failure due to the multithreaded environment.

Database Architecture

As form files are received they are stored 1600 in a database.

The data base control layer is designed to work with a database that is ODBC compliant and supports transactions.

Access to the database is strictly controlled on a per thread basis, this access falls into two categories:
1.) Connections to the data source itself through the ODBC driver.
2.) Access to the individual tables through those connections.

The data base control layer manages connections to the data source by creating the maximum number of connections allowed. It then 'pools' these connections and assigns the next available connection when a request for one is made. These connections are doled out on a per thread basis. A request made for a connection will either receive the next available in the pool or will wait until one becomes available. Access to the individual tables is strictly controlled across all data source connections. Requests to read, modify, or add to tables is managed by the data base layer and is not reliant on the data base in any way for this management. An attempt to access a table currently owned by another thread will result in suspension of that request until that table has been released. This approach not only protects the data source but simplifies data access by exposing a common interface to the developer and freeing him from the responsibility of thread and access management.

An additional benefit of this layer is speed. The connection pooling allows immediate access to the data source without the need to connect to that data source through the ODBC driver at runtime. Frequent allocation and de-allocation of data structures required for connections consumes time and causes memory fragmentation and can increase the chance of system failure and corruption of resources. These processes are eliminated by the data base control layer by creating connections at start up that persist for the life of the program.

To verify the integrity and completeness of input files, a checking application allows a user to open, modify and save files. The files are labeled as a specific type, such as ".AUF" An AUF file has information relating to a user's specific data, as well as version and date information, and is required to be in a specific format. The file checker is a tool for both users and designers of the forms.

In its preferred embodiment, the program will highlight the records that are incorrect by displaying bad records with a red X and good records with a green checkmark. The user can examine and modify these records and then re-save them. The output file is then used as the input file for the viewer application.

Once an AUF file has been opened, the records are displayed in a tree-like structure on the left side of the window. If the user wishes to edit a specific record, it must be selected in this window, or in the main document. Once selected, the record's individual fields will be displayed in the grid at the right-bottom side of the window. The user can then edit these fields as required to make them acceptable for input to the forms viewer application. A list of errors for each record and for each field of the selected field appears in the tab control at the bottom left side of the window. The error tabs, tree control, and record modification tabs are docking controls and may be repositioned by the user.

E-File Creation

To create electronic files (e-files) 2000, two subprograms are included in the main program. One sets up a template for each different form's format. The other takes the relevant data and places it in a file according to the appropriate template. In this way, the same data structure can always be used as input, but the data in the output file can be positioned as the end user sees fit. The template constructor is caller the Electronic File Builder (EFB), and the data-arranging component is called the Converter.

The EFB 2100 was created in response to the varied data and formatting requirements of the entities that accept electronic files. It creates templates for any required electronic format. These electronic formats include, but are not limited to government agency formats, ACH formats, or a format required in a database. It lays out a template that describes how data will be ordered in the required file. Each form/report has different requirements for the arrangement of data, so each report must have its own EFB file.

Most forms require that the data be broken up into blocks (or lines) of data. Each block will contain one or more fields (pieces of data). All the required blocks and the fields contained within them are written into a file that is to be sent in one or more electronic mediums, such as diskette, e-mail, or direct transfer to an FTP site.

A particular style of block may only appear once, or may be repeated several times (with different data). Blocks may also be placed in a certain order. The EFB program gives a user a graphical interface in which to specify blocks of data, the order they are to be written to a file, and whether the block appears once or is repeated several times with new data. For example, the new data for repeated fields may constitute information that applies to employees, with one employee per line.

Fields within blocks also are written in whatever order is specified. The designer can set the length, position, and justification of fields within a block. Fields can be concatenated together to form new fields or made to display unchanging (static) data. Empty spaces in fields can be filled with certain characters. Numbers can be formatted with or without decimals. Certain characters can be removed or added to fields as the designer needs.

The Converter works in tandem with the EFB program. Since both work together, any modifications in the EFB program must be reflected in the code of the Converter. While the EFB is meant for forms designers and administrators, the Converter is meant to run automatically as part of a larger process. Properly implemented, the converter requires no user intervention.

The data that is exported from the forms viewer program comes in a consistent format. For example: a line number, followed by a field name, an employee number (0 if company data), and the information that pertains to that employee and field (the data). Also included is the name of the EFB file that corresponds to the report to be electronically filed.

The Converter 2200 reads the exported data and loads the appropriate EFB. It runs through the blocks and fields in order, matching the fields in the data file with the fields in the EFB file 2300. Fields are manipulated as set in the EFB, with the proper justification, concatenation, removal of characters, or addition of characters. Fields that don't exist in the data file are filled as is specified in the EFB. All fields are then placed according to their proper position. As part of the process, a separate EFB file that contains the format for the file name is opened, which can pull data from the exported file if necessary. A final output file is saved 2400, which is in the correct form to be sent to the government agency.

Electronic Filing of E-Files

The E-File Administration Wizard (EAW) 3000 is an in-house utility that is used by the seller to complete the e-file submission process.

The main dialog, which appears at all times, allows the user to perform several functions. It allows the user to log in or out, or process one of the forms on the list to the left. A form can only be processed if a user is logged in. Detailed information about the form will appear in the list control including such things as the form name, the client, the available submission methods, and the due date.

In its preferred embodiment, a user selects 3100 a form for processing and clicks the "Process Selected Form" button, a dialog appears which allows the user to select 3200 the preferred method of form submission from a list of available methods. When the user selects a method of submission from the available methods of submission, the appropriate wizard is launched. There are a total of four submission wizards: paper printout, floppy magnetic media, FTP, or email. Additionally, however, one of ordinary skill in the art would recognize that other forms of network data transfer such as hypertext transfer protocol (HTTP) and fax machine could also be used.

EAW spawns several other tools in order to complete the submission process. The first two external tools used by EAW are a forms viewer and the builder, which are used for printing out forms, mailing labels, and floppy diskette labels. They are also used for the preparation of magnetic media files. The converter is used to convert magnetic media files into a format that is submitted by the final form user to whom the current form is to be submitted.

The paper submission wizard 3300 has two pages. Page 1 allows the user to spawn forms viewer or the builder to print out the form for submission. Page 2 also spawns forms viewer, this time for the purpose of printing the mailing labels. When this step is completed, the form is marked as submitted in the database.

The floppy diskette submission wizard 3400 has five pages. Page 1 prepares the magnetic media file using forms viewer and the converter. Page 2, launches forms viewer to print mailing labels. Page 3 launches forms viewer to print floppy diskette labels. Page 4 launches forms viewer to print the transmittal letter. Page 5 writes the magnetic media file to a floppy diskette. After this step the form is marked as submitted in the database.

The FTP submission wizard 3500 has two steps. Page 1 prepares the magnetic media file using the program and the converter. Page 2 allows the user to provide FTP information such as FTP site, user-name and password, and so forth. Default data for this page is inferred from the entity to whom this form is to be submitted. When this page is finished, a progress dialog will appear conveying the progress of the FTP transmission. Once this step is completed, the form is marked as submitted in the database.

Finally, the E-mail submission wizard 3600 has two steps. Page 1 prepares the magnetic media file using the viewer and the converter. Page 2 allows the user to provide e-mail information such as email address, subject line, content, and carbon copies. Default data for this page is inferred from the entity to whom the form is to be submitted. Once this step is completed, the form is marked as submitted in the database.

Although the present invention has been described with reference to preferred embodiments, workers skilled in the art will recognize that changes may be made in form and detail without departing from the spirit and scope of the invention. Therefore, the above descriptions to specific hardware, software subprograms and functional elements, and other specific features should not be taken as limiting the scope of the invention, which is defined by the claims.

What is claimed:

1. A method, on a digital computer having a memory and a processor for executing a program, for designing, creating, and importing data into a form viewable by a user of a data processing system, comprising the steps of:
   (a) executing the program to convert a paper form into a form file, the form file comprising a model of the paper form, establishing calculations and rule conditions required to fill in the form, and comprising a data field for receiving data;
   (b) importing data exported from an end user application into a data file and populating the data field in the form file with the imported data;
   (c) performing the calculations on the imported data in the data field;
   (d) allowing the user on the digital computer to review and change the imported data; and
   (e) outputting the viewable form.

2. The method of claim 1, further comprising the step of saving the viewable form as an editable web page.

3. The method of claim 1, further comprising the step of converting the viewable form to plain text and exporting the plain text to another computer system.

4. The method of claim 3, further comprising the step of encrypting the plain text.

5. The method of claim 1, further comprising the step of transmitting the viewable form from a client computer to a server computer and storing the viewable form in a database on the server computer.

6. The method of claim 5, wherein the viewable form is transmitted from the client computer to the server computer over a network.

7. The method of claim 1, further comprising the step of converting the viewable form into an efile form suitable for electronic filing.

8. The method of claim 7, further comprising the step of electronically filing the efile form.

9. The method of claim 8, wherein the step of electronically filing the efile form is performed by storing the efile form on a floppy diskette.

10. The method of claim 8, wherein the step of electronically filing the efile form is performed by submitting the efile form over a network by means of the File Transfer Protocol.

11. The method of claim 8, wherein the step of electronically filing the efile form is performed by submitting the efile form by email.

12. The method of claim 8, wherein the efile form is filed by submitting the efile form by a method selected from the group consisting of: the file transfer program (FTP), electronic mail, hypertext transfer protocol (HTTP), and fax machine.

13. A data processing system, on a digital computer having a memory and a processor for executing a program, for designing, creating, and importing data into a form viewable by a user, comprising:
   (a) a form designer program capable of executing in the memory and directing the processor to create a form file, the form file comprising a model of the form and establishing calculations and rule conditions required to fill in the form, and a data field for receiving data;
   (b) a data file comprising data exported from an end user application program; and
   (c) a viewer program capable of executing in the memory and directing the processor to import the exported data to populate the data field in the form file with the imported data, to allow the user of the data processing system to review and change the imported data, to perform the calculations on the imported data in the data field, and to generate the viewable form.

14. The data processing system of claim 13, further comprising a program executing in the memory and directing the processor to convert the viewable form into an efile form suitable for electronic filing and to electronically file the efile form.

15. The data processing system of claim 14, wherein the efile form is filed by submitting the efile form by a method selected from the group consisting of: the file transfer program (FTP), electronic mail, hypertext transfer protocol (HTTP), and fax machine.

16. The data processing system of claim 13, wherein the viewable form is printed to duplicate the original paper form.

17. A computer-readable memory comprising an application program executable by a computer having a central processing unit, the computer readable memory configured to:
   (a) allow a form designer to create a form file comprising a model of a form, establishing calculations and rule conditions required to fill in the form;
   (b) import data exported from an end user application program into a data file and populate a data field in the form file with the imported data;
   (c) allow a user of the application program to review and change the imported data; and
   (d) perform the calculations on the imported data in the data field and to generate the form.

* * * * *

UNITED STATES PATENT AND TRADEMARK OFFICE
CERTIFICATE OF CORRECTION

PATENT NO. : 8,984,393 B2 Page 1 of 1
APPLICATION NO. : 11/698575
DATED : March 17, 2015
INVENTOR(S) : Arthur D. Jensen et al.

It is certified that error appears in the above-identified patent and that said Letters Patent is hereby corrected as shown below:

In the Specification

At column 4, line 28, delete "form" and insert --from-- therefor.
At column 7, line 13, delete "thing".
At column 10, line 51, after "101100" insert -- →0-- therefor.
At column 11, line 18, delete "colons" and insert --semicolons-- therefor.
At column 14, line 19, delete "with" and insert --will-- therefor.

Signed and Sealed this
Fourteenth Day of July, 2015

Michelle K. Lee
*Director of the United States Patent and Trademark Office*